G. RICHARDS.
CUTTER OR HOB FOR MILLING SCREW THREADS.
APPLICATION FILED FEB. 4, 1919.

1,306,856.

Patented June 17, 1919.

Inventor:
George Richards

UNITED STATES PATENT OFFICE.

GEORGE RICHARDS, OF LONDON, ENGLAND.

CUTTER OR HOB FOR MILLING SCREW-THREADS.

1,306,856.  Specification of Letters Patent.  Patented June 17, 1919.

Original application filed August 14, 1918, Serial No. 249,891. Divided and this application filed February 4, 1919. Serial No. 274,983.

*To all whom it may concern:*

Be it known that I, GEORGE RICHARDS, a citizen of the United States, residing at the Outer Temple, 222 Strand, London, England, have invented new and useful Improvements in Cutters or Hobs for Milling Screw-Threads, of which the following is a specification.

This invention relates to rotary cutters of the hob type for milling screw-threads; that is to say, cutters which, in order to cut the threads to the required depth, are capable of being advanced in a direction at right angles to the axis of the work, but partake of no longitudinal movement in a direction parallel thereto.

In the specifications to British Letters Patent, granted to me and dated 15th October, 1915, No. 14571$^x$, 25th November, 1915, No. 16679, and 15th January, 1916, No. 103318, are described means whereby, in milling screw-threads with the aid of hobs, the formation of facets upon the work is prevented. My present invention relates to simplified means whereby the formation of such facets is prevented; same consisting in the employment of a multiple-thread hob and in spacing the cutting teeth in such a manner that the thread or threads start at different angular points in the periphery thereof.

Figure 2:
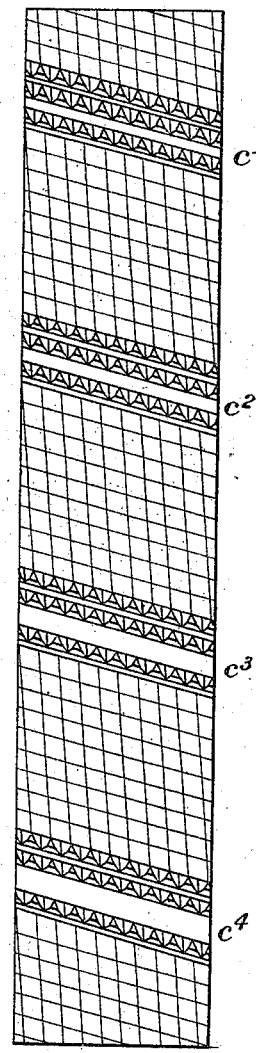
Figure 1:
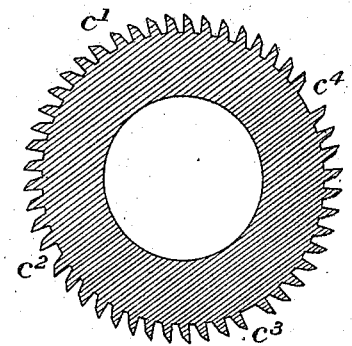

In the accompanying drawings, Figure 1 represents an end view of a multiple-threaded hob, and Fig. 2 a view of its periphery or cutting surface when unfolded.

In the present illustration, the hob is four-threaded, is preferably, although not necessarily, four times the diameter of the work-piece, and is rotated at one fourth the speed thereof. There are four chases of abnormal width, $C^1$, $C^2$, $C^3$, $C^4$, one in each quadrant of the hob surface; but a greater number may be introduced if it be desired to divide the facets more minutely, as will hereafter become apparent. Each of the chases of abnormal width gives the threads not only a new but a relatively different starting point, with the result that the teeth comprised in each group following each abnormal chase come into operation upon the work at a slightly later point as each abnormal and relatively wider chase is passed. Referring to Fig. 2, it will be understood that the points where the lines representing the threads intersect the lines representing the oblique or spiral chases correspond with the points of the teeth shown in Fig. 1; although in Fig. 2, only a few of the spiral lines of teeth are shown. In the present illustration, the chase $C^1$ is $1\frac{1}{4}$ times the normal width, and the teeth following that chase come into operation upon the work one quarter of the normal pitch of the teeth later. The chase $C^2$ is $1\frac{1}{2}$ times the normal with, and the chase $C^3$ is $1\frac{3}{4}$ times the normal width; the teeth respectively following each of these chases coming into operation upon the work half and three-quarters of the normal pitch of the teeth later. The chase $C^4$ is twice the normal width, whereupon the cycle of operations recommences. In this manner, the facets formed by the teeth pertaining to the originally started threads are successively operated on by three sets of toothed threads, each having starting points which are gradually later, as each quadrant of the hob rolls about the circumference of the work-piece; with the result that the facets originally formed are subdivided to such an extent as to be practically negligible.

It will be realized that if the chases of abnormal width be increased to five or six, and the increase in their respective widths is one-fifth or one-sixth of the pitch of the teeth, the facets originally formed will be eliminated in four or five stages, instead of in three, and the object accomplished with greater perfection.

I claim:—

For milling screw-threads, a multiple thread cutter of the hob type formed with numerous spiral chases of normal width and having in each of the several segments of its surface, corresponding with the number of threads in the multiple thread, a chase of abnormal width thereby giving the cutting teeth comprised in that segment a different starting point.

GEO. RICHARDS.

Copies of this patent may be obtained for five cents each, by addressing the "Commissioner of Patents, Washington, D. C."